United States Patent [19]
Subramaniam et al.

[11] Patent Number: 6,081,900
[45] Date of Patent: Jun. 27, 2000

[54] SECURE INTRANET ACCESS

[75] Inventors: Anand Subramaniam, San Jose, Calif.; Hashem M. Ebrahimi, Salt Lake City, Utah

[73] Assignee: Novell, Inc., Provo, Utah

[21] Appl. No.: 09/268,795

[22] Filed: Mar. 16, 1999

[51] Int. Cl.[7] .............................. H04L 9/32; G06F 13/38
[52] U.S. Cl. ........................... 713/201; 713/153; 707/10; 707/513; 709/230; 709/245
[58] Field of Search ..................... 713/151, 153, 713/155, 160, 162, 201; 709/217, 218, 214, 230, 238, 245; 707/10, 501, 513

[56] References Cited

U.S. PATENT DOCUMENTS

| | | | |
|---|---|---|---|
| 5,522,041 | 5/1996 | Murakami et al. | 709/203 |
| 5,550,984 | 8/1996 | Gelb | 395/200.17 |
| 5,553,239 | 9/1996 | Heath et al. | 395/187.01 |
| 5,673,322 | 9/1997 | Pepe et al. | 380/49 |
| 5,706,434 | 1/1998 | Kremen et al. | 709/218 |
| 5,727,145 | 3/1998 | Nessett et al. | 713/200 |
| 5,745,360 | 4/1998 | Leone et al. | 707/513 |
| 5,752,022 | 5/1998 | Chiu et al. | 707/10 |
| 5,757,924 | 5/1998 | Friedman et al. | 713/162 |
| 5,761,683 | 6/1998 | Logan et al. | 707/513 |
| 5,768,271 | 6/1998 | Seid et al. | 370/389 |
| 5,805,803 | 9/1998 | Birrell et al. | 713/201 |
| 5,825,890 | 10/1998 | Elgamal et al. | 380/49 |
| 5,890,171 | 3/1999 | Blumer et al. | 707/501 |
| 5,913,025 | 6/1999 | Higley et al. | 713/201 |
| 5,991,810 | 11/1999 | Shapiro et al. | 709/229 |

OTHER PUBLICATIONS

Andrew S. Tanenbaum, *Computer Networks*, 3d. Ed. (1996), pp. 28–39, 396–417, 601–621, 681–695.
"Securing Communications on the Intranet and Over the Internet", Netscape Communications Corporation (Jul. 1996), pp. 1–12.
"WebSTAR/SSL Security Toolkit: Troubleshooting", no later than Aug. 4, 1998, pp. 1–2.
Paul Ferguson, "What is a VPN?", Apr. 1998, pp. 1–22.
Virtual Private Networking: An Overview, no later than Jun. 25, 1998, pp. 1–20.
"How the proxy works", Jul. 22, 1998, pp. 1–2.
Microsoft Proxy Server Marketing Bulletin, 1998, pp. 1–8.
Microsoft Proxy Server What's New, 1998, pp. 1–4.
"CSM Proxy Server White Paper", 1995–1998, pp. 1–13.
"CSM Proxy Server, the Ultimate Gateway to the Internet!", no later than Aug. 4, 1998, pp. 1–5.
Qun Zhong et al., "Security Control for COTS Components", Jun. 1998 IEEE Computer, pp. 67–73.
"r[3] CypherClient Information", 1998, pp. 1–4.
NetSafe V3.0 The Firewall Solution from Siemens Nixdorf, May 31, 1997, pp. 1–3.
Submission: HTTPS v1.0 Package for OmmiWeb 3.x (Rhapsody), Jan. 24, 1998, pp. 1–3.
OWF basics, Mar. 31, 1997, pp. 1–2.
"info needed to write https proxy", Apr. 11, 1996.
Webroute 1.3.0, May 28, 1997, pp. 1–2.
Werner Feibel, *Novell's Complete Encyclopedia of Networking*, 1995, pp. 625–630.
Bruce Schneier, *Applied Cryptography*, 1994, pp. 436–437.
"A New Management and Security Architecture for Extranets", 1996–1999, pp. 1–14.
Netscape Proxy Server Administrator's Guide, 1997, Contents, Introduction, and Chapters 1–17.

*Primary Examiner*—Gilberto Barrón, Jr.
*Attorney, Agent, or Firm*—Computer Law++

[57] ABSTRACT

Methods, signals, devices, and systems are provided for secure access to a network from an external client. Requests for access to confidential data may be redirected from a target server to a border server, after which a secure sockets layer connection between the border server and the external client carries user authentication information. After the user is authenticated to the network, requests may be redirected back to the original target server. Web pages sent from the target server to the external client are scanned for non-secure URLs such as those containing "http://" and modified to make them secure. The target server and the border server utilize various combinations of secure and non-secure caches. Although tunneling may be used, the extensive configuration management burdens imposed by virtual private networks are not required.

30 Claims, 4 Drawing Sheets

6,081,900

SECURE INTRANET ACCESS

FIELD OF THE INVENTION

The present invention relates to computer network security, and more particularly to the task of providing a user who is presently at a client machine outside the perimeter of a secure network with convenient, efficient, and secure access to data stored on a target server which is located within the secure network.

TECHNICAL BACKGROUND OF THE INVENTION

Distributed computing systems are becoming increasingly useful and prevalent. Distributed computers are now connected by local area networks, wide area networks, and networks of networks, such as the Internet. Many such networks are secured with a security perimeter which is defined by firewall software, routing limitations, encryption, virtual private networks, and/or other means. Machines within the security perimeter are given ready access to data stored in the secure network (possibly subject to user and group permissions, access control lists, and the like), while machines outside the perimeter are substantially or entirely denied access.

With the growth of such secure networks and their information content, there is an urgent need to support secure access by authorized users even when those users log in from a client machine outside the network security perimeter. A wide variety of tools and techniques relating to networks and/or security are known, at least individually and to at least some extent, including: computer network architectures including at least transport and session layers, sockets, clients, and servers; hyperlinks and uniform/universal resource locators (URLs); communications links such as Internet connections and LAN connections; proxy servers for HTTP and some other protocols; internetworking; Kerberos authentication; authentication through certificates exchanged during an SSL handshake; tying certificates to access control lists so that users are identified in certificates presented during the SSL handshake instead of being identified by an IP address, DNS name, or username and password; multiple instances of a server on the same machine in order to serve both insecure and secure documents; using a single password to log into an entire network rather than logging into individual servers; proxy servers as an example of servers which require user authentication; a secure sockets layer protocol manifestation in URLs, including protocol identifiers "http://" and "https://"; the use of a specific server port for network communication; various definitions of VPNs (virtual private networks); "route filtering" which controls route propagation; Point-to-Point Tunneling Protocol (PPTP) and Layer 2 Tunneling Protocol (L2TP); use of encryption technologies to provide the segmentation and virtualization required for VPN connectivity deployed in almost any layer of the protocol stack; transport or application layer VPNs; basic VPN requirements such as user authentication, address management, data encryption, key management, and multiprotocol support; tunneling by packet encapsulation, packet transmission, and packet unencapsulation; Lightweight Directory Access Protocol; a split proxy system for a protected computer network; translation between transport layer protocols; translation between IP and non-IP protocols; a proxy server within a network which receives a request for a protected Web resource from a browser outside the network and requires authentication of the browser to the proxy using some combination of a user ID and/or password; Novell/NetWare Directory Service (NDS) and user access controls; Windows NT Domain directory; Reverse Proxy/Virtual Hosting; a proxy server with HTTP caching; use of a proxy server by configuring client software to connect through the proxy server to prevent the client from being connected directly to the Internet; SSL encryption; an entry manager which serves as a single point of network entry for all users; a Trusted Sendmail Proxy, in the context of sensitivity labels and privileges, including a small, trusted program which acts as a communication path between an inside compartment that performs privileged internal operations and delivers local messages and an outside compartment that collects and send messages without privilege; a secured https proxy which apparently does SSL tunneling, logging, and reacting to events; software which apparently allows use of https URLs by way of an SSL connection with a program that wraps https calls to http; a protocol stream or content processor which knows how to convert something involving an URL into a proprietary content container which knows its content and that content's type, for HTTP, HTTPS, FTP, gopher, and other protocols; redirection of HTTP requests in connection with an HTTP proxy; superuser privileges; and object rights and property rights which apply to properties of an NDS object, as well as distribution of directory information across the network through replication.

References which mention or discuss these and possibly other tools and techniques are identified and discussed relative to the present invention in a Petition for Special Examining Procedure filed concurrently with the present application. To the extent that the Petition describes the technical background of the invention as opposed to the invention itself, the text of the Petition is incorporated herein by this reference. This incorporation by reference does not imply that the claimed invention was previously known.

Although a wide variety of tools and techniques relating to networks and/or security are known, it has not previously been known how to combine them to provide clients outside a secure network perimeter with sufficiently convenient, efficient, and secure access to Web pages stored on servers within the secure network.

For example, some previous approaches require that the user's name and/or password be sent across a network communications link in plain text. Other approaches use only a weak form of encryption, such as uuencoding, to protect the authentication information. In both cases, the authentication information is quite vulnerable to theft and misuse.

As another example, some previous approaches utilized strong encryption but required that special software be previously installed on both the client machine which is seeking access and on the server machine which holds the data sought by the client. Such approaches are taken by many virtual private networks, as well as by individual machines configured with public key/private key encryption software such as PGP software. These approaches protect user authentication information and/or the data which is transmitted after a user is authenticated, but they are not sufficiently convenient and efficient.

In particular, virtual private networks require significant administrative effort and vigilant attention to details in order to avoid problems arising from incorrect or inconsistent configurations. Moreover, widely used Web browsers such as those available from Netscape and Microsoft do not normally include full support for either virtual private networking or application-level encryption software such as PGP software.

Accordingly, it would be an advancement in the art to improve the tools and techniques that are available to provide a user who is presently at a client outside the perimeter of a secure network with convenient, efficient, and secure access to data stored on a server located within the secure network.

Such improvements to secure network access are disclosed and claimed herein.

BRIEF SUMMARY OF THE INVENTION

In one embodiment, the present invention provides a distributed computing system which allows secure external access to a secure network such as a secure intranet. The system includes a target server within the secure network; a border server within the secure network; a client outside the secure network; a user authentication system located at least partially within the secure network; and a uniform resource locator transformer.

The border server is connectable to the target server by a first communications link, such as an intranet or Ethernet link. The client is connectable to the border server by a second communications link, such as a TCP/IP link. The client and the border server are configured to support secure sockets layer communication over the second communications link using SSL or similar software.

The secure network is configured with authentication software and supporting data to allow direct access to the target server by a user only after the user is authenticated by the user authentication system. Typically, the user could readily log onto the network from an internal client at work, and the security questions addressed by the invention arise because the user wishes to log on through an external client at home or in the field rather than an internal one at work.

The uniform resource locator (URL) transformer modifies non-secure uniform resource locators in data being sent from the target server to the client by replacing them with corresponding secure URLs to promote continued use of secure sockets layer communication. The URL transformer is an "SSL-izer". For instance, the URL transformer may replace instances of "http" which refer to locations inside the secure network 100 by corresponding instances of "https" which refer to the same locations. The modifications to the data promote continued use of a secure connection such as an SSL connection. An URL transformer may be located on the border server, on the target server, or both. If the URL transformer is located on the target server, the system may include tunneling software for tunneling secure data (which was transformed into secure form at the target server) between the client and the target server through the border server.

The border server and/or target server may include one or more data caches. For instance, in one configuration the border server has a cache that holds data from the target server which contains non-secure URLs, and the URL transformer introduces secure URLs on the fly without requiring that the transformed data also be cached on the border server. In another configuration, a border server cache includes a non-secure data cache for internal clients and a secure data cache for external clients. The non-secure data cache holds data that contains non-secure URLs, and the secure data cache holds data that does not contain any non-secure URLs. In yet another configuration, the border server cache is simply free of data that contains non-secure URLs.

In short, systems according to the invention use novel URL transformation and more familiar mechanisms such as HTTP redirection and SSL software (in novel ways) to provide secure authentication of a user from an external client and to provide secure transmission of confidential data between the target server and the external client.

By transforming non-secure URLs into secure URLs, the invention forces continued use of secure communications despite the inherent security problems caused by the lack of state information in HTTP. HTTP servers and browsers do not ordinarily "remember" security requirements from one Web page transmission to the next without some assistance. Accordingly, the present invention forces use of HTTPS or a similar secure connection each time the user follows an URL to confidential data. In addition, the invention provides security without requiring the installation of new client or target server software. Other features and advantages of the invention, and embodiments of the invention in methods, storage media, and signals, will all become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, signals, and devices for providing a user located outside a secure network with convenient, efficient, and secure access to data stored within the network. In particular, the invention provides and uses novel modifications to uniform resource locators (sometimes called "universal resource locators" or "URLs") to protect user authentication information and to protect data such as intranet Web pages which are sent to the user from within the secure network. Various components of the invention and its environment are discussed below.

Network and Computer Architecture

Figure 1:
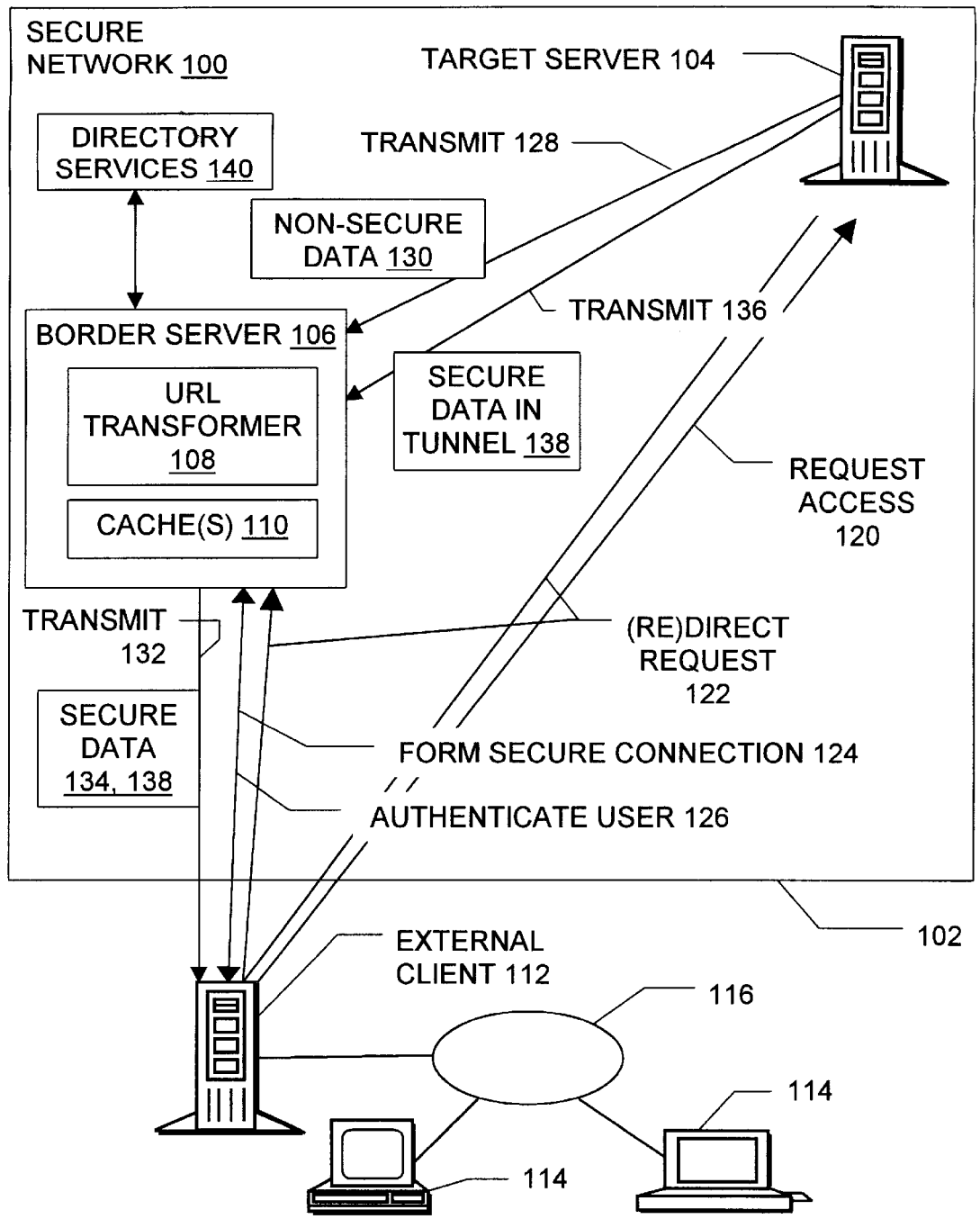
FIG. 1 is a diagram illustrating a secure network, a client outside the network, and several aspects of the present invention which allow secure communication between the client and the network.

One of the many secure computer networks suited for use with the present invention is indicated at 100 in FIG. 1. The secure network 100 has a security perimeter 102 which is defined by firewall software, routing limitations, encryption and/or other means familiar to those of skill in the art. Authorized users can log into particular servers and/or to the network as a whole from clients within the security perimeter and access data of the network 100 subject only to permissions, database locks, and the like, whereas attempts by the same authorized users to access the same data from outside the perimeter 102 are generally not allowed (at least, not without the invention or similar functionality).

A wide variety of secure networks 100 may be configured according to the invention, including both individual computer networks and larger networks which are aggregations of smaller networks. For example, suitable computer networks 100 include local area networks, wide area networks, and/or portions of the Internet such as a private Internet, a secure Internet, a value-added network, or a virtual private network. The secure network 100 may also include or consist of a secure intranet, which is a secure network that employs TCP/IP and/or HTTP protocols internally.

In one embodiment, the secure network 100 includes Novell NetWare® network operating system software (NETWARE is a registered trademark of Novell, Inc.). In alternative embodiments, the secure network 100 includes NetWare Connect Services, VINES, Windows NT, Windows 95, Windows 98, Windows 2000, LAN Manager, or LANtastic network operating system software and/or an implementation of a distributed hierarchical partitioned object database according to the X.500 protocol such as Novell Directory Services or Lightweight Directory Access Protocol (LDAP) directory services (VINES is a trademark of Banyan Systems; NT, WINDOWS 95, WINDOWS 2000, and LAN MANAGER are trademarks of Microsoft Corporation; LANTASTIC is a trademark of Artisoft). The secure network 100 may be connectable to other networks, including other LANs or portions of the Internet or an intranet, through a gateway or similar mechanism.

The secure network 100 includes one or more file or object or Web servers such as a target server 104. The secure network 100 also includes at least one border server 106. The target server 104 and the border server 106 will often run on separate machines, but they may be merely separate processes which share one machine.

In the illustrated configuration, the border server 106 includes an URL transformer 108 and one or more caches 110. As discussed in greater detail below, the URL transformer 108 modifies uniform resource locators (URLs) to protect the confidentiality of data sent to a user outside the secure network 100. The caches 110 are also discussed below.

The secure network 100 may include additional servers and zero or more internal clients. The servers and the internal clients (if any) within the secure network 100 are connected by network signal lines to permit communications links between them in the form of network connections. In addition to their functionality as described herein, one or more of the servers 104, 106 may also be configured by those of skill in the art in a wide variety of ways to operate as Internet servers, as intranet servers, as proxy servers, as directory service providers or name servers, as software component or other object servers, or as a combination thereof. A given computer may function both as an internal client and as a server; this may occur, for instance, in peer-to-peer networks or on computers running Microsoft Windows NT or Windows 2000 software. The servers 104, 106 may be uniprocessor or multiprocessor machines. The servers 104, 106 and internal clients (if any) each include an addressable storage medium such as random access memory and/or a nonvolatile storage medium such as a magnetic or optical disk.

Suitable network 100 internal clients include, without limitation, personal computers, laptops, workstations, disconnectable mobile computers, mainframes, information appliances, personal digital assistants, and other handheld and/or embedded processing systems. The signal lines which support communications links to the servers 104, 106 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile). In addition to the servers 104, 106 and any internal client computers, the secure network 100 may include other equipment such as printers, plotters, and/or disk arrays. Although particular individual and network computer systems and components are shown, those of skill in the art will appreciate that the present invention also works with a variety of other networks and computers.

One or more of the servers 104, 106 and internal clients may be capable of using floppy drives, tape drives, optical drives or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium tangibly embodies a program, functions, and/or instructions that are executable by the servers 104, 106 and/or clients to perform secure network access steps of the present invention substantially as described herein.

The illustrated novel configurations also include an external client 112 which resides (at least initially) outside the security perimeter 102. The external client 112 may be a single workstation, for instance, or another machine of the types discussed above in reference to internal clients. Indeed, internal clients and external clients may differ merely in physical location and in the fact that internal clients have ready access to data stored on the target server 104 without the present invention while external clients gain access through the invention. The external client 112 may also be a server which provides secure access between the secure network 100 and one or more secondary clients 114 on a network 116 which is served by and/or accessed through the client 112.

Operation

With continued reference to FIG. 1 and with reference to FIG. 2 as well, the invention operates generally in the following manner. During a requesting step 120, the external client 112 requests access to data which is stored on the target server 104. From the perspective of the target server 104, this involves receiving a request during a step 200.

By checking the IP address from which the request was made, communicating with the firewall software, or other familiar means, the target server 104 determines that the request came from outside the security parameter 102. Accordingly, the target server 104 does not simply provide the requested data. Of course, even if the request came from inside the security parameter 102, the target server would generally check user permissions against access control lists associated with the data, or take other steps to make sure the requesting user is entitled to access the requested data before providing that data. User permissions, access control lists, labels, and similar security controls which have a granularity smaller than the security perimeter 102 may continue to be used in combination with the security constraints described herein.

In one embodiment, a redirector on the border server 106 redirects the request from the client 112 to the border server 106 during a step 122. The border server 106 is advertised as the target server 104. In practice, the border server 106 will often be on a separate machine than the target server 104, but those of skill in the art will appreciate that the target server 104 and the border server 106 may also run on the same machine. The redirection may be accomplished using redirection capabilities which are part of the HTTP protocol. These redirection capabilities are conventionally used to automatically redirect Web browsers when a Web site has moved, that is, when the URL for the Web site has changed. In the context of the present convention, the Web site for which access is sought has not moved, in that the desired data still resides on the target server 104. Instead, HTTP redirection provides a convenient and efficient tool for sending requests from external clients to the border server 106 to maintain security as described herein.

For example, assume that the target server 104 is identified by the URL "http://www.Novell.com". The redirection step 122 might return the following URL to the external client 112:

https://BorderManager:443?"http://www.Novell.com"

(for authentication), or it might return the URL:

https://BorderManager:443?"https://www.Novell.com:443"

(authentication and force through the SSL-izer). Several things are worth noting in such a redirection URL signal.

First, the redirection signal seeks to change the protocol from HTTP to HTTPS. As those of skill in the art will recognize, the HTTPS protocol uses secure sockets layer communication. A familiar embodiment of secure sockets layer communication is provided by SSL software operating according to U.S. Pat. No. 5,825,890 assigned to Netscape Communications Corporation. However, as used herein the term "secure sockets layer communication" is not limited to SSL connections but instead includes any form of network communication which utilizes encryption in TCP/IP sockets and which is widely available in Web browsers and the servers with which those browsers communicate.

Second, the redirection signal refers to the border server 106 as "BorderManager" in deference to the BorderManager product line from Novell, Inc. (BorderManager is a mark of Novell, Inc.). Those of skill in the art will understand that the border server 106 need not be a Novell BorderManager server, but need merely operate as claimed herein.

Third, the redirection signal refers to port 443 of the border server 106. Those of skill in the art will appreciate that other ports may also be used, through a port override, for instance. Moreover, redirection need not utilize a dedicated port; it is simply convenient in many cases to do so.

Fourth, in its most general form, the redirection signal simply includes a delimited non-secure URL adjoined to a secure URL. The non-secure URL http://www.Novell.com identifies the target server 104, while the secure URL https://BorderManager identifies the border server 106. To conform with HTTP syntax, the non-secure URL is delimited in the example redirection signal by double quotes; other delimiters may be used with other protocols. The non-secure URL is non-secure because it does not require use of a secure connection such as a secure sockets layer or SSL link; the secure URL is secure because it does require such a secure connection.

Fifth, those of skill in the art will appreciate that directory path names and filenames may be appended to these examples to identify specific Web pages or other protected resources. For instance, the original request may have been for the web page which is located at "http://www.Novell.com/~hashem/foo_design.htm".

Sixth, those of skill in the art will also appreciate that FTP files, gopher resources, and other data on the target server 104 may be handled in a similar manner.

Finally, those of skill in the art will appreciate that a wide variety of signal field orderings, data sizes, and data encodings, and other variations are possible. The inventive signals may also be embodied in a system in various media. For instance, they may take the form of data stored on a disk or in RAM memory, or the form of signals on network communication lines. Some embodiments will include all signal elements discussed above, while others omit and/or supplement those elements. However, the distinctive features of the invention, as set forth in the appended claims, will be apparent in each embodiment to those of skill in the art.

During a step 124, a secure connection is formed between the border server 106 and the external client 112. This connection may be, for instance, an SSL connection formed in response to use of "https" as a protocol indicator in a request from the client 112 to the border server 106. For convenience, reference is made primarily to connections with a user of the external client 112. However, as noted earlier the client 112 may itself be a server or another node in a communications path between a user who is located at another machine 114 and who is seeking access to target server 104 data.

Figure 2:
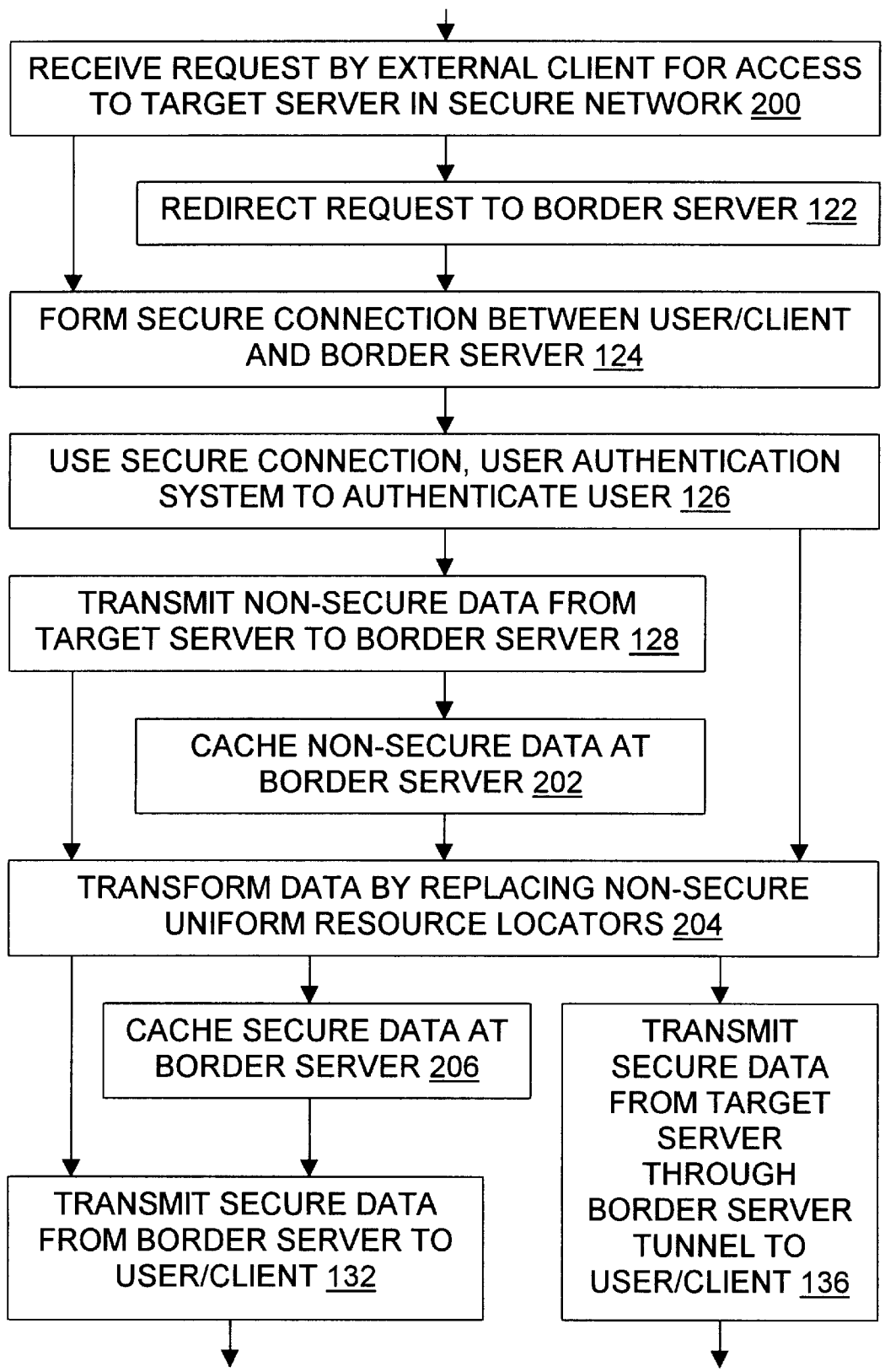
FIG. 2 is a flowchart illustrating several methods of the present invention.

As indicated in FIG. 2, in some cases the external client 112 may contact the border server 106 directly so that no redirection is needed. That is, the initial request for access to the target server 104 may be directed to the border server 106 to save time. Moreover, the initial request may be combined with a request for a secure connection as discussed with reference to step 124.

Alternatively, the secure connection may be formed during step 124 before a specific request is made to the target server 104 despite the fact that step 200 is shown above step 124 in FIG. 2. More generally, steps according to the present invention may be performed in a variety of orders and the execution of steps may overlap when the result of one step is not required by another step. Steps may also be omitted, renamed, repeated, or grouped differently than shown, provided they accomplish the claimed process.

During a step 126, the user is authenticated to the secure network 100. This generally involves transmitting user authentication information over the secure connection from the client 112 to the border server 106, verifying the information within the secure network 100, and notifying the user that the authentication information has been accepted as valid. This may be accomplished in various ways.

For instance, some embodiments use an HTML page with scripts, or a Java applet, to present the user with a login screen. The user enters a user name and a corresponding password in fields shown on the login screen. The username and password are then transmitted over the secure connection to the border server 106, which passes them in turn to an authentication system within the secure network 100. If the username and password are validated by the authentication system, the border server 106 so notifies the user, and the user is then granted access to secure network 100 data as described herein (subject to permissions and the like).

In one embodiment which utilizes Novell NDS software 140, the username and user password presented by the user are that user's regular NDS name and password, which the user would typically present when logging into the secure network 100 from an internal client. The user need not manage a separate username and/or password in order to login from an external client. The login screen presented to the user may also include contextual information, such as the user's context within an NDS tree. The border server 106 presents the NDS username and password to the familiar NDS user authentication system, and looks to that authentication system for rejection or validation of the authentication information. Instead of using a Novell Directory Services database 140, or in addition to that database, the user authentication system may include a Microsoft Windows NT Domain directory 140. An embodiment of the invention which does not utilize NDS software may also authenticate a user to all servers in the secure network 100 after recognizing a single user name and a single corresponding user password.

During a step 128, non-secure data 130 is transmitted from the target server 104 to the border server 106, where it will be modified to promote continued security and then forwarded to the external client 112 during a transmitting step 132. In one embodiment, the transmitting step 128 includes a preliminary act and one or more subsequent repeated acts, as follows.

The preliminary act within the transmitting step 128 is to direct (or redirect) the external client 112 to the target server 104, and to promote use of a secure connection in so doing by making a secure connection the default. This may be done by using the HTTP redirection capability in combination with substitution of "https" for "http" in the URL which identifies the target server 104 data sought by the external client 112. In the example above, the original request from the external client 112 was for data at "http://www.Novell.com" so the redirection back to the target server 104 (after the user is authenticated to the secure network 100 during step 126) would seek data at "https://www.Novell.com" with directory and path names appended as in the original request.

The possibly repeated acts within the transmitting step 128 involve sending one or more Web pages, files, or other pieces of non-secure data 130 from the target server 104 to the border server 106. The data 130 is non-secure in that it includes hypertext links, URLs, or other references which, if presented by the external client 112 to the secure network 100, would not necessarily require use of a secure connection such as an SSL connection and which might allow non-secure access to protected network 100 data. For instance, Web pages which contain URLs specifying "http://" rather than "https://" in reference to data stored on the target server 104 are examples of non-secure data 130.

During an optional caching step 202, the non-secure data 130 may be cached in a cache 110 at the border server 106. Caching tools and techniques familiar in the art may be used; caching is discussed further below.

During a transforming step 204, the non-secure data 130 is transformed into secure data 134 by an URL transformer 108 which replaces non-secure URLs with corresponding secure URLs. For instance, the URL transformer 108 may employ familiar string search-and-replace algorithms to replace each instance of the string "http" which is tagged in HTML data 130 as an URL protocol indicator by the string "https". As noted, similar steps may be taken with FTP and other protocol indicators.

Care should be taken to avoid replacing string instances which are not being used within an URL as a protocol indicator. For example, instances of the string "http" in the text of this patent application would not be replaced, nor would instances which are being used as part of a directory path or a filename rather than a protocol indicator, because such replacements would not promote continued use of secure sockets layer communication.

Like other elements of the present invention, the transformer 108 may be implemented using the teachings presented here with programming languages and tools such as Java, Pascal, C++, C, Perl, shell scripts, assembly, firmware, microcode, logic arrays, PALs, ASICs, PROMS, and/or other languages, circuits, or tools as deemed appropriate by those of skill in the art.

During an optional caching step 206, the secure data 134 may be cached, using caching tools and techniques familiar in the art. Either, both, or neither of the caching steps 202, 206 may be present in a given embodiment. That is, the border server 106 may include zero, one, or two caches 110.

For instance, the non-secure data 130 may be stored in one cache 110 while the secure data 134 is stored in another cache 110. Secure data 134 is transmitted during a step 132 to external clients 112 from the secure cache 110, while non-secure data 130 is provided to internal clients from the non-secure cache 110. This split cache configuration provides the benefits of caching both to external clients and to internal clients, and it does not impose URL transformation processing costs on internal clients that only access non-secure data 130.

Another configuration stores data requested by external clients in one cache 110 regardless of whether the data has also been requested by internal clients, and stores data requested only by internal clients in another cache 110. The data requested by external clients is stored in its non-secure form and its URLs are transformed to create secure data 134 only as needed before putting data on the wire to an external client. The data sent to internal clients may include a mixture of non-secure data 130 and secure data 134; during step 132 only secure data 134 is sent to external clients.

Alternatively, all data sent to internal and/or external clients may be stored in a single cache 110, with URL transformation again being performed on-the-fly as needed when cached data is to be sent to an external client during step 132. Of course, caching may also be simply omitted in some embodiments.

As discussed above, the invention may operate by sending non-secure data 130 from the target server 104 to the border server 106, where the data is transformed by the URL transformer 108 and then transmitted as secure data 134 to the external client 112. Several variations on this approach are also possible according to the invention. Some involve caching alternative discussed above. Other variations alter the location or function of the URL transformer 108 and/or involve tunneling.

For example, after the user is authenticated during step 126 the border server 106 may function merely as a node on a path which carries secure data 134 from the target server 104 to the external client 112. This configuration may be appropriate if the target server 104 only holds secure data 134. Even if the URL transformer 108 rarely or never modifies any URLs in practice, it may still be capable of performing such modifications in case its filtering function does find any non-secure URLs. In addition, or as an alternative, the URL transformer 108 may notify an administrator if non-secure URLs are found.

It may also be appropriate for the border server 106 to function merely as a data carrier node if an URL transformer 108 is part of the target server 104 instead of (or in addition to) being part of the border server 106. The target server 104 can then transform any non-secure data 130 into secure data 134 before forwarding that data 134 to the border server 106 for subsequent transmission to the external client 112. For example, in one embodiment a transmitting step 136 sends secure data in tunneling packets 138 to the border server 106, which then forwards the data 138 to the external client 112 during a step 132. Familiar tunneling tools and techniques may be used during step 136 to transmit data which has been made secure through URL transformation according to the invention.

Additional Information

Figure 3:
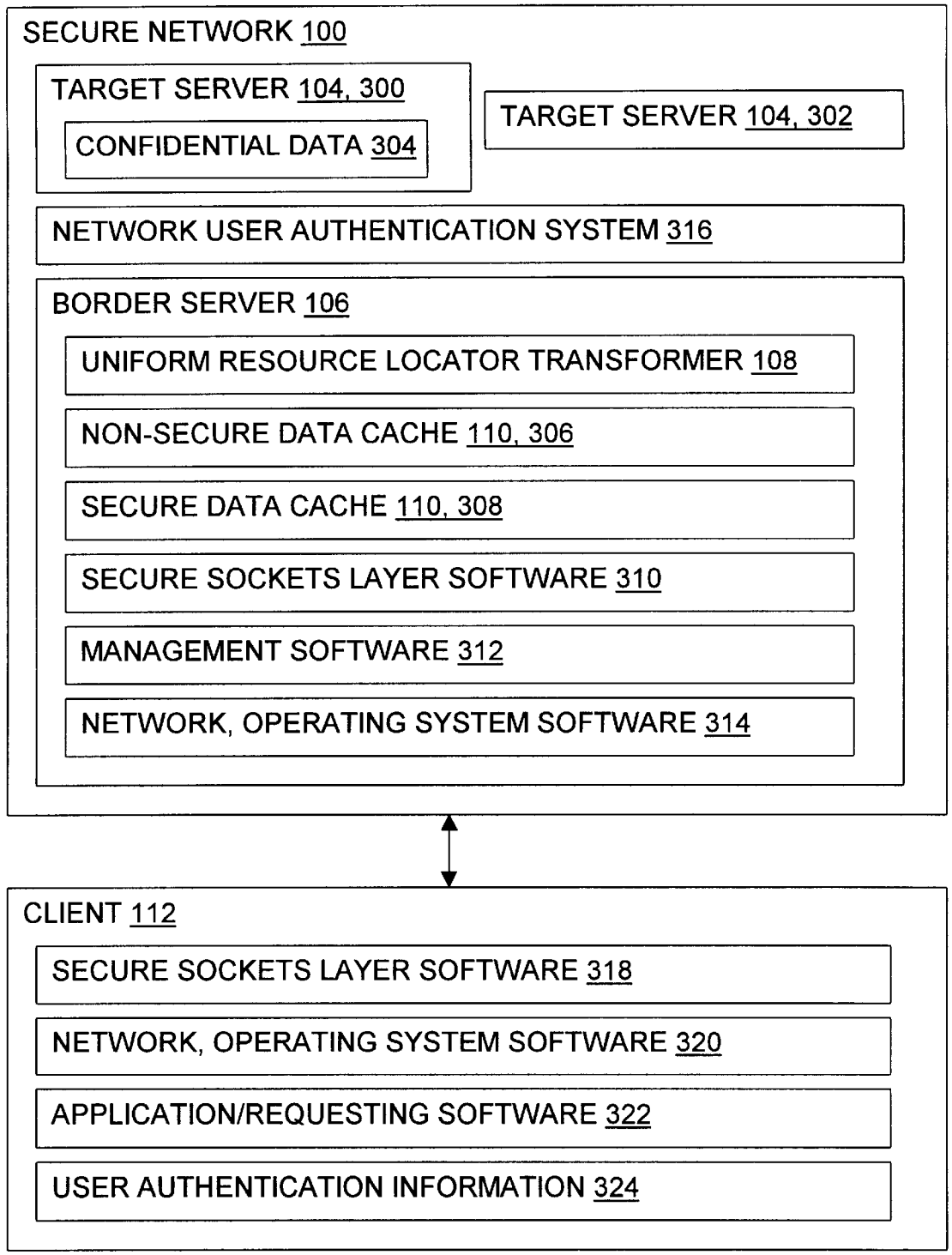
FIG. 3 is a diagram further illustrating one embodiment of the client and secure network shown in FIG. 1.
Figure 4:
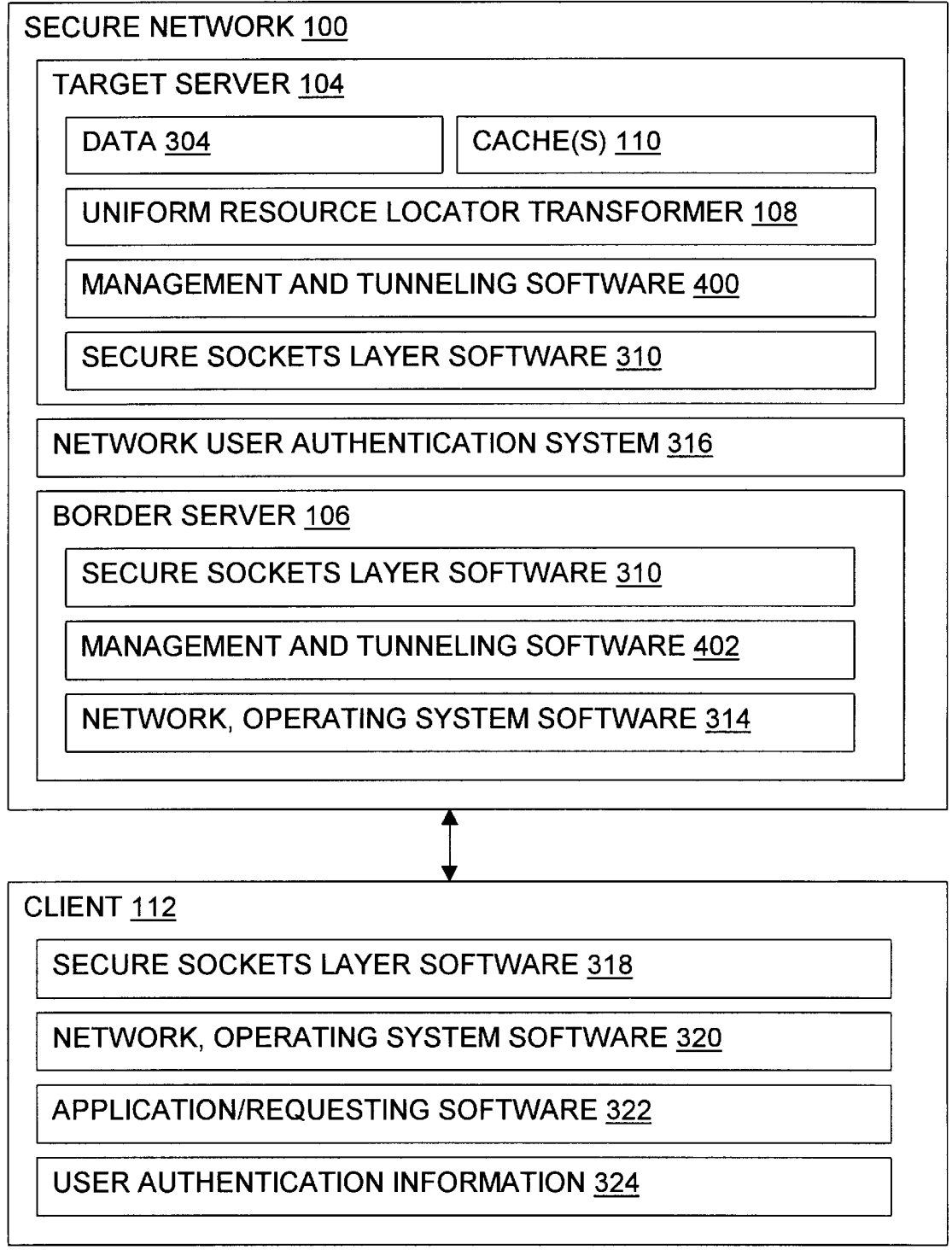
FIG. 4 is a diagram further illustrating another embodiment of the client and secure network shown in FIG. 1.

FIGS. 3 and 4 further illustrate the invention. FIG. 3 shows a configuration containing two target servers 300, 302, illustrating the fact that some embodiments of the invention involve two (or more) target servers 104. Thus, confidential data 304 to which an external client 112 seeks access may be stored in the secure network 100 on one or more target servers 104. The protected data 304 may be a mix of secure (e.g., containing "https" only) data and non-secure (e.g. at least one instance of "http" referring to data within the secure network 100) data.

In FIG. 3 the URL transformer 108 is located in the border server 106. By contrast, FIG. 4 shows a configuration in which the URL transformer 108 is part of the target server 104. Accordingly, the configuration of FIG. 3 assumes that non-secure confidential data 304 is sent from the target server 104 to the border server 106, transformed at the border server 106 by the URL transformer 108, and then provided to the external client 112. By contrast, the configuration of FIG. 4 assumes that non-secure confidential data 304 is transformed into secure data by the URL transformer 108 at the target server 104, after which the modified data is sent either directly to the external client 112 (bypassing the border server 106) or indirectly to that client 112 by way of the border server 106. Indirect transmission of secure data from the target server 104 through the border server 106 to the external client 112 could utilize, for instance, familiar tunneling tools and techniques.

For purposes of illustration, FIG. 3 shows both a non-secure data cache 306 and a secure data cache 308 as part of the border server 106. As discussed above, however, the border server 106 may also be configured according to the invention with only one of these two caches 306, 308, or with a combined cache 110 containing both secure and non-secure data, or with no cache 110. Those of skill in the art will also appreciate that the target server 104 may also include zero or more caches 110.

The border server 106 includes secure sockets layer software 310, and the external client 112 includes corresponding secure sockets layer software 318. As noted above, any commercially available software which provides a secure connection through encryption at the sockets level can be used to form the secure connection provided by the software 310, 318. Suitable software 310, 318 thus includes the SSL software provided commercially by Netscape Corporation and other vendors.

The border server 106 also includes management software 312. In various embodiments, the management software 312 provides some or all of the following functionality to permit system operation as discussed herein: handling requests which are redirected during step 122 and subsequently redirecting the external user back to that target server 104 after step 124 forms a secure connection and step 126 authenticates the user; invoking the URL transformer 108 as necessary to prevent non-secure data from being transmitted to an external client 112; managing the caches 110; interfacing with a network user authentication system 316 such as the NDS authentication system; logging user and/or system activity; alerting administrators to possible problems such as multiple failed authentication attempts, failed secure connection attempts and/or lack of resources such as memory or disk space; and managing information such as the IP address and/or session identifier used by a given external client 112 to make certain that secure data is transmitted only to the authenticated user.

The border server 106 also includes standard network and operating system software 314. Suitable networking software 314 includes Novell NetWare software, various TCP/IP implementations, Ethernet software, and other commercially available networking software. Suitable operating system software 314 includes UNIX, Linux, and UNIX variations, Microsoft Windows, and other commercially available operating system software.

The client 112 likewise includes networking and operating system software 320. Suitable software 320 includes commercially available software such as that previously mentioned. It is not necessary for the client 112 and the border server 106 to be running the same operating system and/or the same networking software, so long as a secure connection can be formed. For instance, the border server 106 might use UNIX software while the client 112 runs Windows 2000 software, with each using their respective SSL software to provide the necessary secure connection.

The client 112 includes an application program or some other piece of requesting software 322 which makes the access request during step 120. Requests may be prompted by human users and/or by system tasks or threads. The software 322 which seeks access to confidential data 304 from outside the security perimeter 102 will often be a Web browser. However, the present invention also provides secure access to other types of requesting software, including without limitation: indexing programs, search programs, database-building tools, archival tools, administrative tools, collaborative writing tools, multimedia conferencing software, and lower-level software such as file system software, operating system software, and/or networking software.

The client 112 also contains user authentication information 324. As noted above, the authentication information 324 which is used to authenticate the user and/or client to the network 100 during step 126 will often include a user name and a corresponding user password. These are preferably the same name and password used by the authorized user to log into an internal client of the secure network 100. In place of, or in addition to a user name and password, the authentication information may include certificates, tokens, public keys, and/or data from authentication tools such as biometric scans, voice prints, retinal scans, fingerprint scans, magnetic card reader results, and so on. A wide variety of suitable authentication information is familiar to those of skill in the art.

The configuration shown in FIG. 4 has much in common with the configuration shown in FIG. 3, at least with respect to many of the individual components. For instance, the comments made above regarding the confidential data 304, the caches 110, the URL transformer 108, the secure sockets layer software 310, 318, the network and operating system software 314, 320, the requesting software 322, the network user authentication system 316, and the user authentication information 324 apply to both Figures.

However, the functionality of the management software 312 on the border server 106 may be divided in the configuration of FIG. 4 between management and tunneling software 400 in the target server 104 and management and tunneling software 402 in the border server 106. The management software 312 functionality may also be supplemented by tunneling functionality. Suitable tunneling functionality is available through the literature and commercially available tunneling implementations.

The software 400 may also include the redirector for redirecting to the border server 106 the request made by the client 112 for direct access to the target server 104. This allows user authentication during step 126 to be performed by the border server 106 while URL transformation and data transmission are performed by the target server 104 and/or by the target server 104 in combination with the border server 106.

Summary

The present invention uses novel URL transformations and/or more familiar mechanisms such as HTTP redirection and SSL software to provide secure authentication of a user from an external client and to then provide secure transmission of confidential data between the target server and the external client. By transforming non-secure URLs into secure URLs, the invention forces continued use of secure communications despite the inherent security problems of HTTP. These problems arise from the fact that HTTP does not normally "remember" security requirements from one Web page transmission to the next. The present invention forces use of a secure connection each time the user follows an URL to confidential data. Moreover, the invention provides this security without requiring any additional distribution or installation of client software onto the external client(s) beyond that which is already widely used.

Although particular methods and signal formats embodying the present invention are expressly described herein, it will be appreciated that system and storage media embodiments may also be formed according to the signals and methods of the present invention. Unless otherwise expressly indicted, the description herein of methods and signals of the present invention therefore extends to corresponding systems and storage media, and the description of systems and storage media of the present invention extends likewise to corresponding methods and signals.

As used herein, terms such as "a" and "the" and item designations such as "URL" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A distributed computing system allowing secure external access to a secure network, the system comprising:
   a target server within the secure network;
   a border server within the secure network, the border server connectable to the target server by a first communications link;
   a client outside the secure network, the client connectable to the border server by a second communications link, the client and the border server configured to support secure sockets layer communication over the second communications link;
   a user authentication system located at least partially within the secure network, the secure network configured to allow direct access to the target server by a user only after the user is authenticated by the user authentication system; and
   a uniform resource locator transformer which modifies non-secure uniform resource locators in data being sent from the target server to the client by replacing them with corresponding secure uniform resource locators to promote continued use of secure sockets layer communication.

2. The system of claim 1, wherein the uniform resource locator transformer is located on the border server.

3. The system of claim 1, wherein the uniform resource locator transformer is located on the target server and the system further comprises tunneling software for tunneling between the client and the target server through the border server.

4. The system of claim 1, wherein the secure network is configured to allow direct access to the target server from network addresses within the secure network while denying direct access to the target server from network addresses outside the secure network.

5. The system of claim 1, wherein the secure network includes a secured intranet.

6. The system of claim 1, wherein the client is a multi-user client.

7. The system of claim 6, wherein at least two user workstations are connected to the client.

8. The system of claim 1, wherein the user authentication system includes a directory services database.

9. The system of claim 1, wherein the user authentication system includes a domain directory.

10. The system of claim 1, wherein the user authentication system authenticates the user to all servers in the secure network after recognizing a single user name and a single corresponding user password.

11. The system of claim 1, further comprising a redirector for redirecting to the border server a request made by the client for direct access to the target server.

12. The system of claim 1, wherein the border server includes at least one cache.

13. The system of claim 12, wherein the border server cache includes data from the target server which contains non-secure uniform resource locators, and the uniform resource locator transformer introduces secure uniform resource locators on the fly without requiring that the transformed data also be cached on the border server.

14. The system of claim 12, wherein the border server cache includes a non-secure data cache for internal clients and a secure data cache for external clients, the non-secure data cache holding data that contains non-secure uniform resource locators, and the secure data cache holding data that does not contain non-secure uniform resource locators.

15. The system of claim 12, wherein the border server cache is free of data that contains non-secure uniform resource locators.

16. A method for providing access to a secure network, the method comprising the steps of:
   receiving a request for access to a target server which is within the secure network, the access request having been made by a user outside the secure network;
   forming a secure sockets layer connection between the user and a border server which is within the secure network;
   using the secure sockets layer connection and a user authentication system of the secure network to authenticate the user to the secure network;
   modifying data by replacing non-secure uniform resource locators in the data with corresponding secure uniform resource locators which promote continued use of secure sockets layer communication; and
   transmitting the modified data to the user over a secure sockets layer connection.

17. The method of claim 16, wherein the modifying step is preceded by the step of transmitting the data to be modified from the target server to the border server in response to the access request, and the modifying step is performed at the border server.

18. The method of claim 17, further comprising the step of caching data on the border server.

19. The method of claim 16, wherein the modifying step is performed at the target server, and the transmitting step transmits the modified data to the user over a secure sockets layer connection which tunnels through the border server.

20. The method of claim 16, wherein the receiving step includes receiving the access request at the target server and the method further comprises the step of redirecting the request to the border server before the forming step.

21. The method of claim 16, wherein the forming step includes storing an IP address which indicates the current location of the user, and the step of transmitting the modified data to the user transmits the data only to that same IP address.

22. The method of claim 16, wherein the forming step forms an SSL connection.

23. The method of claim 16, wherein the using step includes obtaining from the user a user name and a user password.

24. The method of claim 16, wherein the step of modifying the data includes replacing the string "http" with the string "https" in at least one uniform resource locator.

25. A computer storage medium having a configuration that represents data and instructions which will cause performance of method steps for providing access to a secure network, the method comprising the steps of:

receiving at a target server which is within the secure network a request for access to the target server, the access request having been made by a user outside the secure network;

redirecting the request to a border server which is within the secure network;

forming a secure connection between the user and the border server, the secure connection utilizing at least a transport layer protocol and lower level protocols, security in the connection being provided at least by encryption performed above the transport layer protocol;

using the secure connection and a user authentication system of the secure network to authenticate the user to the secure network;

modifying data by replacing non-secure uniform resource locators in the data with corresponding secure uniform resource locators which promote continued use of secure communication; and transmitting the modified data to the user over a secure connection.

26. The configured storage medium of claim 25, wherein the forming step includes storing an IP address and a session identifier which collectively indicate the current location of the user, and the step of transmitting the modified data to the user transmits the data only to that same IP address and session.

27. The configured storage medium of claim 25, wherein the using step includes obtaining from the user a user name and password for network-wide authentication.

28. The configured storage medium of claim 25, wherein the modifying step is preceded by the step of transmitting the data to be modified from the target server to the border server in response to the access request, and the modifying step is performed at the border server.

29. The configured storage medium of claim 28, wherein the method further comprises the step of caching data on the border server.

30. The configured storage medium of claim 25, wherein the modifying step is performed at the target server, and the transmitting step transmits the modified data to the user over a secure sockets layer connection which tunnels through the border server.

* * * * *